3,455,852
MOLDING COMPOSITION COMPRISING MELAMINE-FORMALDEHYDE PLASTIC/COAL TAR DISTILLATE
Joseph G. Crist, Mount Lebanon Township, Allegheny County, Carl R. Manganaro, Penn Hills Township, Allegheny County, and Elliott V. Nagle, Franklin Township, Westmoreland County, Pa., assignors to United States Steel Corporation, a corporation of Delaware
No Drawing. Filed June 2, 1966, Ser. No. 554,650
Int. Cl. C08g 51/52, 51/18, 37/30
U.S. Cl. 260—17.3     4 Claims

ABSTRACT OF THE DISCLOSURE

A melamine-formaldehyde molding composition which contains wood flour filler and coal tar distillate. The filler and distillate are used in approximately equal proportions by weight and together constitute about 30 to 40 percent of a product molded from the composition. Advantages are a lower-cost product, since both added materials are less costly than melamine-formaldehyde, and improved strength and hardness. The content of distillate which can be added is limited, since any excess exudes from the mold when an article is formed from the composition.

---

This invention relates to an improved melamine-formaldehyde molding composition.

Molded products formed of melamine-formaldehyde compositions have many desirable properties, but high cost has limited their use. In an attempt to lower the cost, so-called industrial grades of melamine-formaldehyde have been developed which incorporate inexpensive fillers, such as wood flour or sulfite pulp. Nevertheless their cost remains so high that they are not competitive with other molding compositions. Another composition developed to bring about wider use of melamine moldings is the phenol-modified melamine. Introduction of phenol in the polymerization of melamine with formaldehyde produces a modified polymer which has desirable properties, but likewise fails to overcome the economic handicap, since phenol itself is relatively costly.

An object of our invention is to provide an improved melamine-formaldehyde molding composition which incorporates a comparatively large proportion of a compatible low-cost material, namely coal-tar oil distillate.

A further object is to provide a molding composition of the foregoing type, molded products of which have greater impact, flexural and compressive strength than those of conventional melamine-formaldehyde compositions.

According to our invention, we incorporate in a melamine-formaldehyde molding composition a coal-tar oil distillate which boils above about 350° C. or preferably above 360° C. The properties of the distillate may vary slightly, but a typical analysis shows 3.3 percent by weight boiling between 300° and 360° C., 67.6 percent by weight boiling between 360° and 400° C., and 29.0 percent by weight boiling above 400° C., a specific gravity of 1.185 (25° C./25° C.), a Conradson coke value of 5.54, and a benzene-insoluble content of 0.19 percent by weight. We prefer to include the maximum possible content of distillate in the molding composition. If we include too much, excess distillate exudes from the plastic as it is molded and causes difficulties with the mold. Preferably we also add wood flour to the molding composition as a filler in a quantity such that the finished plastic contains approximately equal parts wood flour and distillate. The combined content of wood flour and distillate in the finished plastic preferably is 30 to 40 percent by weight. At the extreme limit, we can include up to about 20 percent tar distillate in the starting recipe based on the sum of the weights of melamine and aqueous formaldehyde. At the extreme limit the molded plastic contains about 20 percent by weight tar distillate.

In preparing the plastic, we mix melamine and aqueous formaldehyde in the usual way in proportions of about 3 to 6 moles of formaldehyde per mole of melamine. We add glacial acetic acid or equivalent to adjust the pH to a value of 5.5 to 6.5, or preferably about 6. We add the tar-oil distillate, stir the mixture rapidly, and heat it to about 35° to 60° C., or preferably about 50° C. We hold the mixture at this temperature for about 35 to 60 minutes, or preferably about 45 minutes. Next we add the filler, preferably a wood flour, such as that available commercially as "Solka-Floc," and dry the mixture in a vacuum oven at a temperature up to about 80° C., or preferably about 60° C. We pulverize the dried material to pass a 6-mesh screen. The resulting material is ready to be molded. We perform the molding operation by packing the material within a mold and heating it to about 120° C. under pressure on the order of 3800 pounds per square inch.

EXAMPLE I

As a specific example to demonstrate how our invention can be practiced, we prepared a mixture of 56 grams melamine and 144 grams aqueous 37 percent formaldehyde and adjusted the pH value to 6 by adding 0.2 milliliter glacial acetic acid. We then added 20 grams of tar-oil distillate boiling above 360° C. and having the properties already described. We stirred the mixture rapidly, heated it to about 50° C., and held it at this temperature for about 45 minutes. We added 20 grams wood flour, dried the mixture in a vacuum oven at about 60° C., and pulverized the material to pass a 6-mesh screen. We placed this material in two compression molds, one with a rectangular cavity 1.2 by 5.2 inches and another with a 2 inch diameter circular cavity. We cured the material by heating it in the mold to 120° C. and compressing it under a force of 3800 pounds per square inch for five minutes. No tar oil was exuded during the molding process. We tested the strength of the molded bodies, the results of which are tabulated hereinafter.

EXAMPLE II

For purposes of comparison, we repeated the steps described in Example I, except we doubled the quantity of tar-oil distillate, using 40 grams thereof. In this instance some tar was exuded from the mold. We also molded bodies of a phenol-modified melamine-formaldehyde molding composition and tested these under similar conditions. The results were as follows:

| Recipe | Phenol-modified plastic | Tar oil-modified plastics | |
|---|---|---|---|
| | | Example I | Example II |
| Melamine, g | 56 | 56 | 56 |
| Aqueous formaldehyde (37%), g | 144 | 144 | 144 |
| Phenol, g | 40 | 0 | 0 |
| Tar oil, g | 0 | 20 | 40 |
| Polymerization temperature, ° C | 35 | 50 | 50 |
| Polymerization time, min | 30 | 45 | 45 |
| Wood flour filler, g | 60 | 20 | 20 |
| Curing temperature, ° C | 155 | 120 | 120 |
| Data for the plastic: | | | |
| Tar-oil content, wt. percent | 0 | 15.8 | 19.0 |
| Wood flour content, wt. percent | 34.4 | 14.0 | 17.2 |
| Impact strength, ft.-lb. per inch of notch | 0.11 | 0.18 | 0.19 |

For a further comparison, we molded bodies of two commercial general purpose melamine-formaldehyde molding powders by the procedure described in Example I. The results were as follows:

| | Izod impact strength, ft.-lb./in. (ASTM Method D 256) | Flexural strength, p.s.i. (ASTM Method D 790) | Compressive strength, p.s.i. (ASTM Method D 695) | Rockwell hardness M-scale (ASTM Method D 785) |
|---|---|---|---|---|
| Commercial composition A | 0.15 | 2,210 | 6,140 | 101-107 |
| Commercial composition B | 0.17 | 3,030 | 16,690 | 81-102 |
| Tar-oil-modified melamine-formaldehyde plastic of Example I | 0.18-0.19 | 3,770 | 11,960 | 75-90 |

From the foregoing description, it is seen that our invention affords a melamine-formaldehyde molding composition which makes maximum use of inexpensive modifying materials. Compared with phenol-modified compositions, our composition not only is cheaper, but the molded products are stronger and harder.

While we have described only certain preferred compositions and ranges, it is apparent that modifications may arise.

We claim:

1. A molding composition consisting essentially of a melamine-formaldehyde plastic and a coal tar-oil distillate boiling above about 350° C., said distillate being in an amount up to about 20 percent of the sum of the weights of melamine and aqueous formaldehyde.

2. A molding composition comprising a melamine-formaldehyde plastic, a wood flour filler and a coal tar-oil distillate boiling above about 350° C., the melamine and formaldehyde being supplied in the ratio of about 3 to 6 moles of formaldehyde per mol of melamine, the filler and distillate being present in approximately equal parts by weight and in an amount that together they provide about 30 to 40 percent by weight of a product molded from the composition, said composition being moldable without exuding distillate during the molding operation.

3. A product molded from the composition defined in claim 2.

4. A composition as defined in claim 2 in which said distillate contains about 3.3 percent by weight material boiling below 360° C., about 67.6 percent by weight material boiling between 360° and 400° C., and about 29.0 percent by weight material boiling above 400° C.

References Cited

UNITED STATES PATENTS

| | | | |
|---|---|---|---|
| 3,383,345 | 5/1968 | Bauer | 260—28 |
| 2,487,309 | 11/1949 | Champagnat et al. | 260—17.2 |
| 2,715,615 | 8/1955 | Bell et al. | 260—17.4 |
| 3,207,687 | 9/1965 | Maier | 260—28 |
| 3,354,105 | 11/1967 | Trieschock | 260—28 |

WILLIAM H. SHORT, Primary Examiner

E. M. WOODBERRY, Assistant Examiner

U.S. Cl. X.R.

260—28, 67.6